United States Patent
Rajimwale et al.

(10) Patent No.: US 12,216,547 B1
(45) Date of Patent: Feb. 4, 2025

(54) GRANULAR DATA SOURCE IDENTIFICATION FOR OBTAINING DEDUPLICATION STORAGE EFFICIENCY WITHIN A CLUSTERED ENVIRONMENT

(71) Applicant: EMC IP Holding Company LLC, Hopkinton, MA (US)

(72) Inventors: Abhishek Rajimwale, San Jose, CA (US); George Mathew, Belmont, CA (US); Murthy Mamidi, San Jose, CA (US); Donna Barry Lewis, Holly Springs, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 348 days.

(21) Appl. No.: 16/547,234

(22) Filed: Aug. 21, 2019

(51) Int. Cl.
*G06F 11/14* (2006.01)
*G06F 16/174* (2019.01)

(52) U.S. Cl.
CPC ...... *G06F 11/1453* (2013.01); *G06F 16/1748* (2019.01); *G06F 2201/84* (2013.01)

(58) Field of Classification Search
CPC ... G06F 11/1453; G06F 16/1748; G06F 11/14
See application file for complete search history.

(56) References Cited

U.S. PATENT DOCUMENTS

| | | | | |
|---|---|---|---|---|
| 8,275,886 | B1* | 9/2012 | Galan | H04L 41/0886 714/6.2 |
| 11,520,744 | B1* | 12/2022 | Rajimwale | G06F 16/901 |
| 2003/0172157 | A1* | 9/2003 | Wright | G06F 11/1469 709/225 |
| 2010/0332456 | A1* | 12/2010 | Prahlad | G06F 16/1827 713/160 |
| 2013/0007387 | A1* | 1/2013 | Sakaguchi | G06F 11/0775 711/161 |
| 2015/0269239 | A1* | 9/2015 | Swift | G06F 16/27 707/610 |
| 2017/0228290 | A1* | 8/2017 | Maccanti | G06F 11/1469 |
| 2017/0242871 | A1* | 8/2017 | Kilaru | G06F 11/2094 |

* cited by examiner

*Primary Examiner* — Etienne P Leroux
*Assistant Examiner* — Farhad Agharahimi
(74) *Attorney, Agent, or Firm* — Dergosits & Noah LLP; Todd A. Noah

(57) ABSTRACT

Described is a system (and method) that maintains deduplication efficiency when storing data within a clustered data storage environment that implements a global namespace. To provide such a capability, the system may obtain granular data source identifying information from a client system that provides data to be backed-up by a backup component. The data source identifying information may take the form of a placement tag that is associated with the received data. The backup component may then provide such placement tags when providing the backup data to the clustered storage system. The placement tags may then be used to intelligently distribute backup files to particular storage nodes of the clustered storage system to improve deduplication efficiency.

20 Claims, 7 Drawing Sheets

GRANULAR DATA SOURCE IDENTIFICATION FOR OBTAINING DEDUPLICATION STORAGE EFFICIENCY WITHIN A CLUSTERED ENVIRONMENT

TECHNICAL FIELD

This disclosure relates to managing deduplicated backup data, and more particularly, obtaining data source identifying information to achieve deduplication efficiency within a clustered storage environment.

BACKGROUND

Clustered storage systems employ various techniques for distributing data across a set of nodes of a cluster. For example, incoming data may be divided into chunks that are distributed evenly across the set of nodes to balance storage capacity and resource utilization. However, in a clustered storage system that supports deduplication, evenly distributing chunks of data across the set of nodes may create deduplication inefficiencies. For example, a clustered storage system may employ a global namespace that represents the storage system as a single storage unit to external components. Accordingly, multiple generations of related data may be stored on different nodes of the cluster leading to a loss of deduplication efficiency. Accordingly, there is a continued need to efficiently manage deduplicated data in clustered storage environment.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Figure 1:
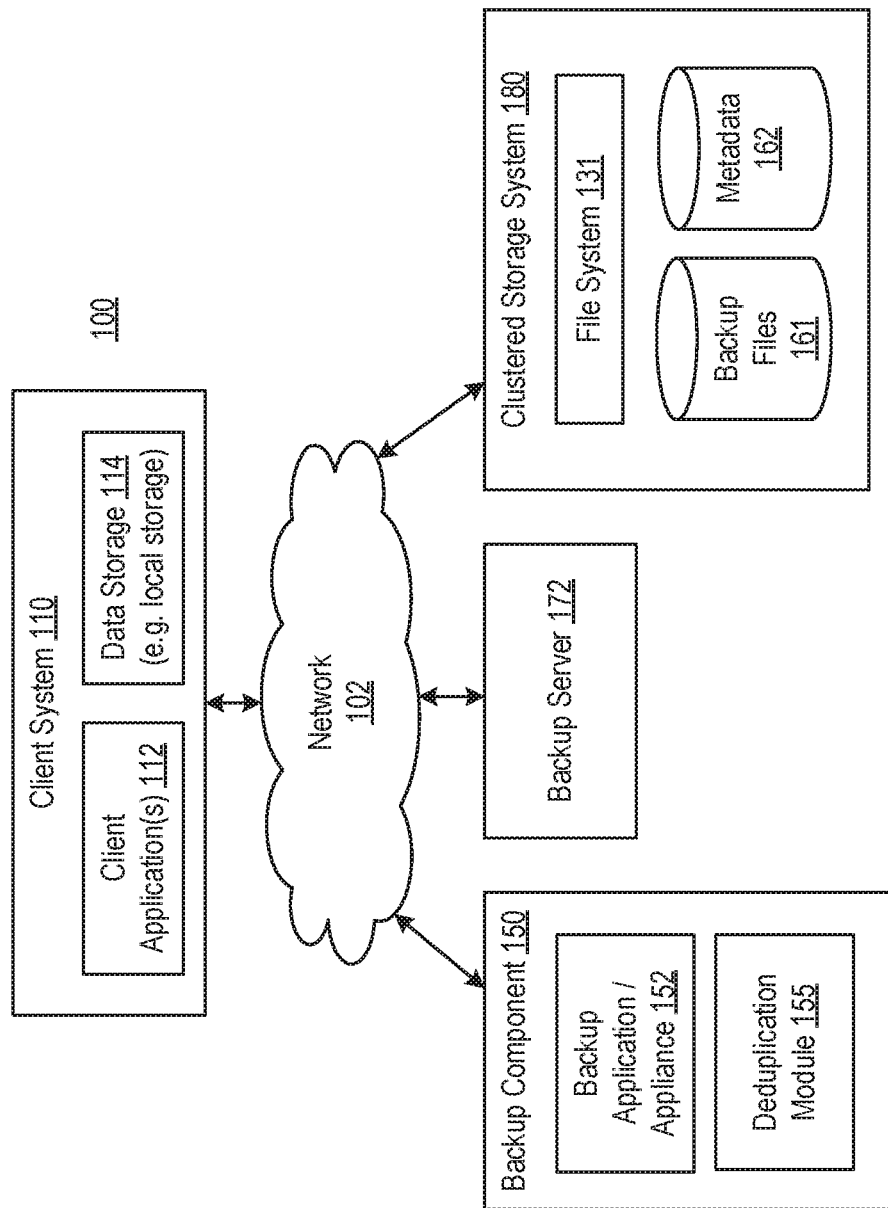
FIG. 1 is a block diagram illustrating an example operating environment for providing data source information to a clustered storage system according to one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) that maintains deduplication efficiency when storing data in a clustered or distributed storage environment. To provide such a capability, the system may obtain data source identifying information from a client system that provides data to be backed-up. The data source identifying information may be associated with particular backup data that is provided to the clustered storage system. For example, the identifying information may take the form of a placement tag that is provided when transferring the backup data for storage on the clustered storage system. The clustered storage system may then use such identifying information to intelligently distribute the backup files to particular storage nodes within a cluster.

More particularly, in some embodiments, the system may leverage the ability for front-end component (e.g. backup processing components) to access various types of information from a client server. This information may be used to perform a granular data source identification for the data to be backed-up by the system. By identifying a data source of data used to create backup files, the system may predict (e.g. to a certain degree of certainty) that certain backup files contain related data such as data that is part of a common data protection set. After obtaining data source identifying information, the system may derive a data source identifier that is associate the data with particular backup data. Accordingly, the data source identifiers may be passed along (e.g. via a transfer protocol or operations) to the back-end components (e.g. clustered storage system). The propagated data source identifiers may then be used by back-end components to intelligently distribute data within the clustered environment. For example, subsequent backup data created from a shared data source may be associated with a common data protection set (e.g. data for a particular application, client/customer, etc.), and therefore, share a data source identifier. In turn, data associated with a particular data source identifier may be stored together within a clustered environment. For example, backup files from the same source (e.g. sharing a data source identifier) may be stored on the same storage node (or data partition).

In previous deduplicated clustered storage systems, backup systems typically have access to origination information related to a more general server component that provides data to be backed-up. Such a server component, however, may support multiple data sources such as storage devices, virtual machines, databases, etc. that all store data of multiple data protections sets associated with multiple clients or customers. In addition, prior deduplicated clustered storage systems would have to perform a resource intensive data sampling to determine a potential data source. Moreover, a previous deduplicated clustered storage system often implement a global namespace, and accordingly, unless specified, data from the same data protection set may be distributed across the cluster, which appears as a single system to external components. In contrast, some embodiments of present disclosure allow front-end components to efficiently identify a data source to a degree of granularity required to identify potentially related backup data. Accordingly, in some embodiments, described is a system that leverages such granular identification information to obtain deduplication efficiency within a clustered storage environment.

In some embodiments, such a system may be provided within an operating environment. An example of such an operating environment is further described herein with reference to FIG. 1. However, in general, embodiments of the disclosure may include and/or be implemented in an operating environment including a cloud services environment that may be, or include, a data protection operating environment that includes a backup and clustered storage environment. For example, at least some functionality may be provided by, or implemented in connection with, various platforms such as the Dell/EMC Data Domain™ data protection platform, and associated systems, methods, and components, although use of this particular platform is provided only by way of illustration and is not required.

In some embodiments, the storage environment may take the form of a cloud storage environment. However, embodiments of the disclosure may also be implemented for an on-premises storage environment, and hybrid storage environments that include public and private elements, as well as any other type of storage environment. In addition, any of these cloud environments, or other operating environments, may take the form of an operating environment that is partly, or completely, virtualized. The storage environment may include one or more host devices that each host one or more applications used by a client of the storage environment. As such, a particular client may employ, or otherwise be associated with, one or more instances of each of one or more applications. In general, the applications employed by the clients are not limited to any particular functionality or type of functionality. Some example applications may include database applications (e.g. a SQL Server), filesystems, as well as other types of data stores. The applications on the clients may generate new and/or modified data that is desired to be protected.

Any of the devices, including the clients, servers and hosts, in the operating environment can take the form of software, physical machines, or virtual machines (VM), or any combination thereof, though no particular device implementation or configuration is required for any embodiment. Similarly, data protection system components such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the term "backup data" or "backup file" (or "data backups." "backed-up data." etc.) is intended to be construed broadly and includes, but is not limited to, partial backups, incremental backups, full backups, clones, snapshots, any other type of copies of data, and any combination of the foregoing. Any of the foregoing may, or may not, be deduplicated. In addition, the storage of data can employ any suitable storage technique, infrastructure, hardware (e.g. Solid State Drive (SSD), Hard Disk Drive (HDD)), or on virtual storage systems provided by a cloud service provider, etc.

More specifically, and with reference to FIG. 1, shown is a block diagram illustrating an example of an operating environment 100 for providing data source information to a clustered storage system according to one or more embodiments of the disclosure. As shown, the environment 100 may include a client system 110, backup system 150, backup server 172, and a clustered storage system 180. It should be noted that the components of operating environment 100 may interact via a network 102, which may be any type of wired or wireless network including a local area network (LAN), a wide area network (WAN), or a direct communication link, or other suitable connection.

As shown, the operating environment 100 may include a client or client system (or computer, or device) 110 that may be associated with a client or customer of a data backup and protection service, and a backup system 150 that may be associated with a data backup and protection service provider. For example, the client system 110 may provide computing resources (e.g. webservers, databases, etc.) for users (e.g. website visitors) of the customer, data from which may be protected by the backup and data protection service provider. Accordingly, the client system 110 may act as a client from which backups are performed. In some embodiments, the client system 110 may comprise a virtual machine. In addition, the client system 110 may host one or more client applications 112, and may include data storage 114, as well as an interface for communicating with other systems and devices, such as the backup system 150. In general, the client applications 112 may create new and/or modified data that is desired to be protected. As such, the client system 110 is an example of a host device. The data storage 114 can be used to store client data, which may, along with the client system 110 (e.g. client applications 112) may be backed up using the backup system 150. As further described herein, components of the client system 110 (e.g. client applications, 112, data storage 114, etc.) may be a data source, or be associated with, one or more data sources such as a database, VM, storage device, etc. In addition, components of the client system 110 may be data sources that are associated with the client system 110, but reside on separate servers such as a data server, or a cloud-computing infrastructure. The client system 110 may include a backup client application, or plug-in application, or API that cooperates with backup system 150, to create backups of client data. The backed-up data can also be restored to the client system 110.

In one embodiment, backup component 150 may represent one or more components of a Data Domain™ Restorer (DDR)-based deduplication storage system, and backup server 172 may be implemented in conjunction with a Data Domain deduplication storage server provided by Dell/ EMC™ Corporation for use with DDR storage devices. For example, the backup server 172 may be a stand-alone entity, or can be an element of the clustered storage system 180. In some embodiments, the backup server 172 may be an EMC Corp. Avamar server or an EMC Corp. Networker server, although no particular server is required, and other backup and storage system configurations are contemplated.

The backup component 150, may include a backup application (or appliance) 152 that performs (or manages, coordinates, etc.) the creation and restoration of data that may be backed-up. For example, data to be backed-up from the client system 110 may be communicated from the client system 110 to the backup application 152 for initial processing, after which the processed data is uploaded from the backup application 152 for storage at the clustered storage system (e.g. as backup data 161). In some embodiments, the backup application 152 may cooperate with a backup client application of the client system 110 to back up client data to the clustered storage system 180. A backup application 152 may also cooperate with a backup client application to restore backup data from the clustered storage system 180 to the client system 110. In some embodiments, the backup application 152 may be a part of, or work in conjunction with, a storage appliance. For example, the storage appliance may include a Dell-EMC CloudBoost appliance, although any suitable appliance is contemplated. In addition, the backup application 152 may provide a variety of useful functionalities such as source-side data deduplication, data compression, and WAN optimization boost performance and throughput while also possibly reducing the consumption and cost of network bandwidth and cloud storage capacity. One, some, or all, of these functions of the backup application 152 may be performed using deduplication logic via deduplication module 155. For example, the deduplication module 155 can provide data segmentation, as well as in-flight encryption as the data is sent by the storage application 152 to the clustered storage system 180. It should be noted that the backup application (or storage appliance) 152 can be implemented in various forms, such as a virtual, physical, or native public cloud appliance to fit the requirements of a particular configuration, and the backup application 152 can be used with various types of data protection environments, including public and private object storage clouds.

The clustered storage system 180 (as further described herein) may store backup files 161 within a one or more nodes (as further described herein). As shown, the clustered storage system 180 may also store metadata 162 for (or associated with) the backup files 161, and one or more instances of a filesystem 131 that catalogs backup files and other data residing in the clustered environment. In general, the storage of backup files 161 may be configured to store client system 110 data backups that can be restored in the event of a loss of data.

Figure 2:
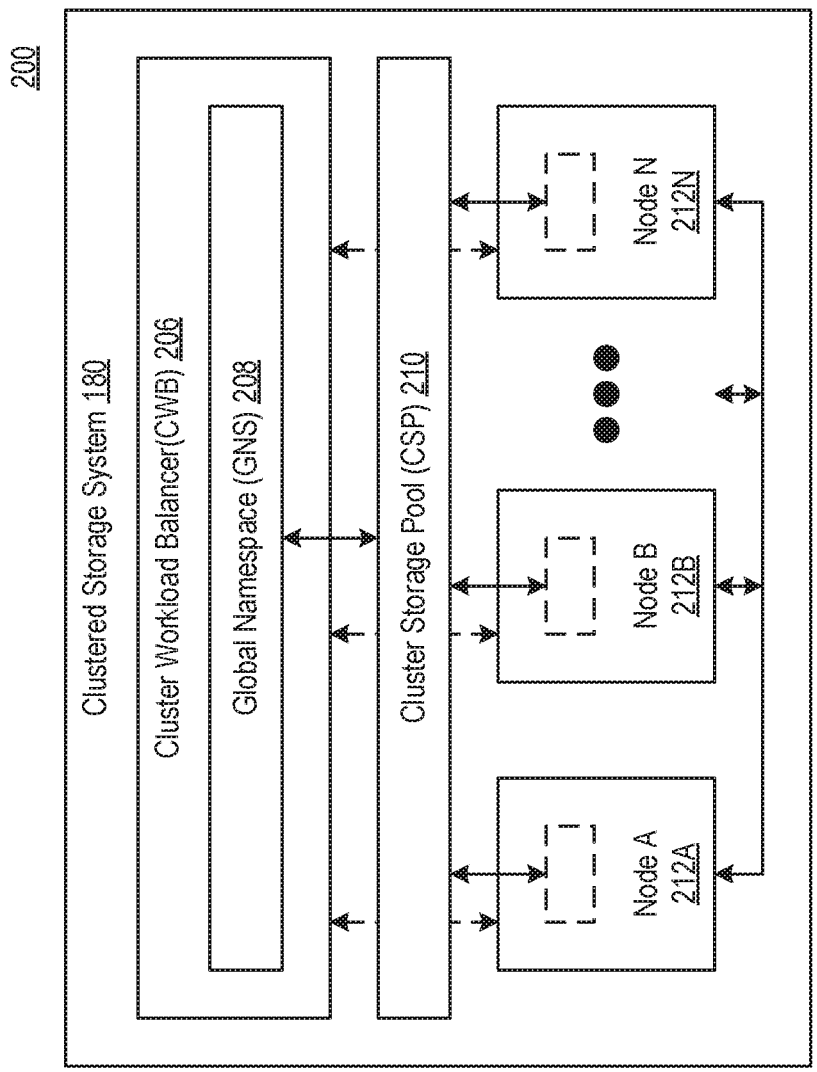
FIG. 2 is a block diagram illustrating an example clustered storage system according to one or more embodiments of the disclosure.

FIG. 2 is a block diagram 200 illustrating an example clustered storage system according to one or more embodiments of the disclosure.

The clustered storage system 180 may represent a deduplicated cluster storage system (or service), distributed storage system (or service), distributed file system (or service), etc. As shown, the clustered storage system 180 may include, or represent, a group of linked nodes (or storage nodes) 212A-N, which may be configured to share resources. The shared resources may include computing resources (e.g. computer processors and memory), storage resources (e.g. persistent data storage), and network resources (e.g. traffic bandwidth). Further, the sharing of any resource may entail virtualizing the resource in each node to create a logical pool of that resource that spans, and is made available to all nodes (e.g. nodes 212A-N), across the clustered storage system 180. For example, when considering storage resources, the physical device (e.g. HDDs, SSDs, etc.) representative of the local storage resources on each node may be virtualized to form a globally-accessible cluster storage pool (CPS) 210. Accordingly, the CPS 210 may represent a logical pool of disk capacity formed from all storage resources across the clustered storage system 180.

In some embodiments, a node 212 may represent a physical computing system dedicated to storing backup files, processing workloads, and other operations. For example, processing workloads may include processing service requests submitted to the clustered storage system 180 such as receiving file operation requests delegated from the cluster workload balancer (CWB) 206, processing the file operation requests (e.g. write requests as further described herein), and returning file operation responses back to the CWB 206 based on results obtained from processing the file operation requests. It should be noted that a node 212 may perform other functionalities without departing embodiments of the disclosure.

In some embodiments, the clustered storage system 180 may include a cluster workload balancer (CWB) 206. The CWB 206 may represent a physical computing system dedicated to distributing service traffic across the various nodes of the clustered storage system 180. This distribution of service traffic (also referred as load balancing) may reduce individual node (212A-N) workload, may prevent any one node from becoming a single point of failure, and may improve the responsiveness and availability of the deduplicated storage service provided by the clustered storage system 180. To the extent of load balancing, the CWB 206 may include the following functionalities: monitoring and tracking resource availability, for any given point in time, across the various nodes, receiving file operation requests from the upstream components (e.g. backup component 150, backup server 172, etc.); selecting the best available nodes to process the file operation requests based on the tracked resource availability; delegating the file operation requests to the best available nodes for processing; receiving file operation responses from the best available nodes; and forwarding the file operation responses to the requesting components.

In some embodiments, the CWB 206 may also represent a single point of contact, for the clustered storage system 180, with which components (e.g. of environment 100) may interface. In some embodiments, the clustered storage system 180 may maintain a global namespace (GNS) 108, which may be managed by the CWB 206. The GNS 208 may refer to an abstraction that unifies the various local filesystems, maintained by the various nodes (212A-N) across the clustered storage system 180, into a single virtualized global filesystem. The single virtualized global filesystem may subsequently be presented to the components in order to simplify the management and accessibility of storage and/or data across the clustered storage system 180, which may be aggregated in the form of the CPS 210.

Figure 3:
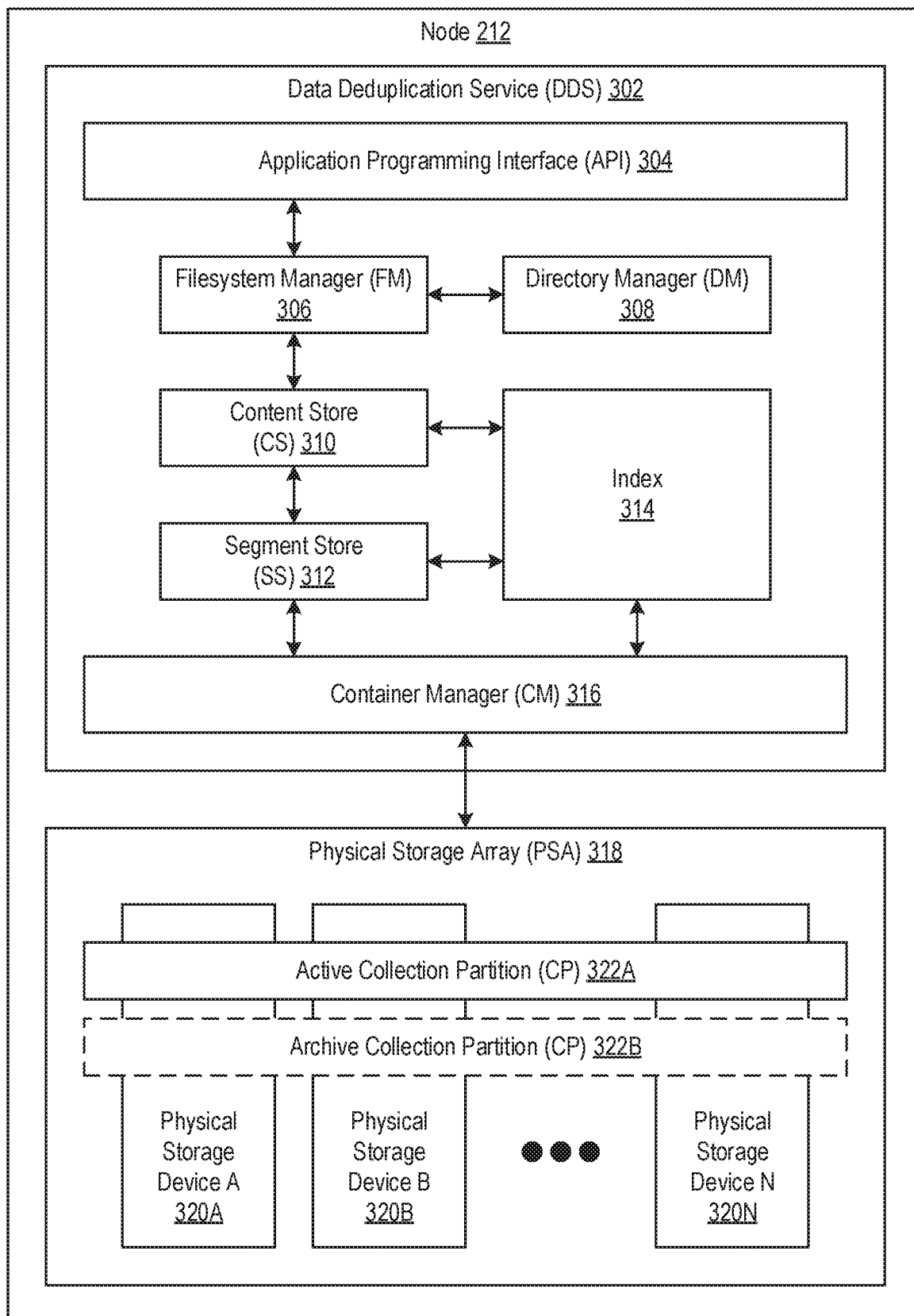
FIG. 3 is a block diagram illustrating an example storage node according to one or more embodiments of the disclosure.

FIG. 3 is a block diagram 300 illustrating an example storage node according to one or more embodiments of the disclosure. As shown a node 212 may include a data deduplication service (DDS) 302 operatively connected to a physical storage array (PSA) 318.

In some embodiments, the DDS 302 may represent a component that may be responsible for consolidating and/or retrieving data (e.g. backup files from the PSA 318). In some embodiments, the DDS 302 may perform such responsibilities while performing data deduplication. In some embodiments, the DDS 302 may include an application programming interface (API) 304, a filesystem manager (FM) 306, a directory manager (DM) 308, and a content store (CS) 310, a segment store (SS) 312, an index 314, and a container manager (CM) 316. Each of these DDS 302 subcomponents is described below.

The API 304 may represent an interface through which external entities such as the cluster workload balancer (CWB) 206 and other nodes 212 in a cluster may interact with the DDS 302. Accordingly, the API 304 may employ a set of subroutine definitions, protocols, and/or tools directed to enabling communications between the DDS 302 and the external entities.

The FM 306 may represent a component responsible for the coordination of DDS 302 operations. To that extent, the FM 306 may include functionality to: receive file operations delegated to the node 212 for processing; invoke other DDS 302 subcomponents (e.g. the DM 308 and the CS 310) towards processing received file operations; issue remote procedure calls (RPC) to other (remote) nodes; and issue file operation reports based on results yielded from processing received file operations.

The DM 308 may represent a component responsible for the management of files in one or more filesystems across the clustered storage system 180. To that extent, the DM 308 may include functionality to maintain, traverse, and update one or more namespace trees. For example, a namespace tree may represent a hierarchical data structure directed to reflecting the way files and/or directories may be identified and stored in data storage (e.g. the PSA 318).

The CS 310 may represent a component responsible for the management of file content associated with various files consolidated in the PSA 318. To that extent, the CS 310 may include functionality to maintain, traverse, and update various segment trees. For example, a segment tree may refer to a Merkel tree, or a hierarchical data structure, for identifying and tracking the locations of file segments, pertinent to a single file, stored in the physical storage devices (320A-N) of the PSA 318. If the PSA 318 is formed from one physical storage device (320A-N), the locations of the pertinent file segments may be indicated through disk offsets. Alternatively, if the PSA 318 is formed from multiple physical storage devices (320A-N), the locations of the pertinent file segments may be indicated through physical storage device (320A-ON) identifiers in addition to disk offsets.

The SS 312 may represent a component responsible for assessing whether new file segments, yielded from the CS 310, may already be stored. Should new file segments be stored already, metadata for those new file segments, rather than the new file segments themselves, may be stored to optimize storage space utilization. In conjunction with the CS 310, the SS 312 may include functionality to execute data deduplication on the node 212.

The index 314 may represent a data structure that may be used to locate stored file segments within one or more physical storage devices (320A-N) of the node 212. More specifically, the index 314 may include associations that map fingerprints (or hashes) to storage locations that consolidate the file segments that which the fingerprints represent.

The CM 316 may represent a component responsible for the management and tracking of containers. A container may refer to a logical grouping of compression regions consolidated in data storage (e.g. PSA 318). Each compression region, in turn, may encompass a compressed and/or archived data object that stores one or more file segments and their associated metadata within.

Returning to the node 212 components, in some embodiments, the PSA 318 may represent a collection of one or more physical storage devices (320A-N) on which various forms of information (e.g. backup files) may be stored and/or consolidated. Examples of a physical storage device (320A-N) may include, but are not limited to, a hard disk drive (HDD), a solid state drive (SSD), and network attached storage (NAS), etc. An active collection partition (CP) 322A may be implemented and span across at least a subset of the physical storage devices (320A-N) of the PSA 318. Generally, a CP may represent a deduplication domain. A deduplication domain may refer to a group of files that dedupe together. Accordingly, the active CP 322A may represent a logical storage pool wherein a collection of files stored therein dedupes only with other files in the logical storage pool. In some embodiments, an archive CP 322B may also be implemented and span across at least another subset of the physical storage devices (320A-N). In contrast to the active CP 322A, which may store frequently accessed and/or recently created files, the archive CP 322B may represent a logical storage pool wherein aged, seldom accessed files may reside and dedupe with other aged, seldom accessed files.

Figure 4:
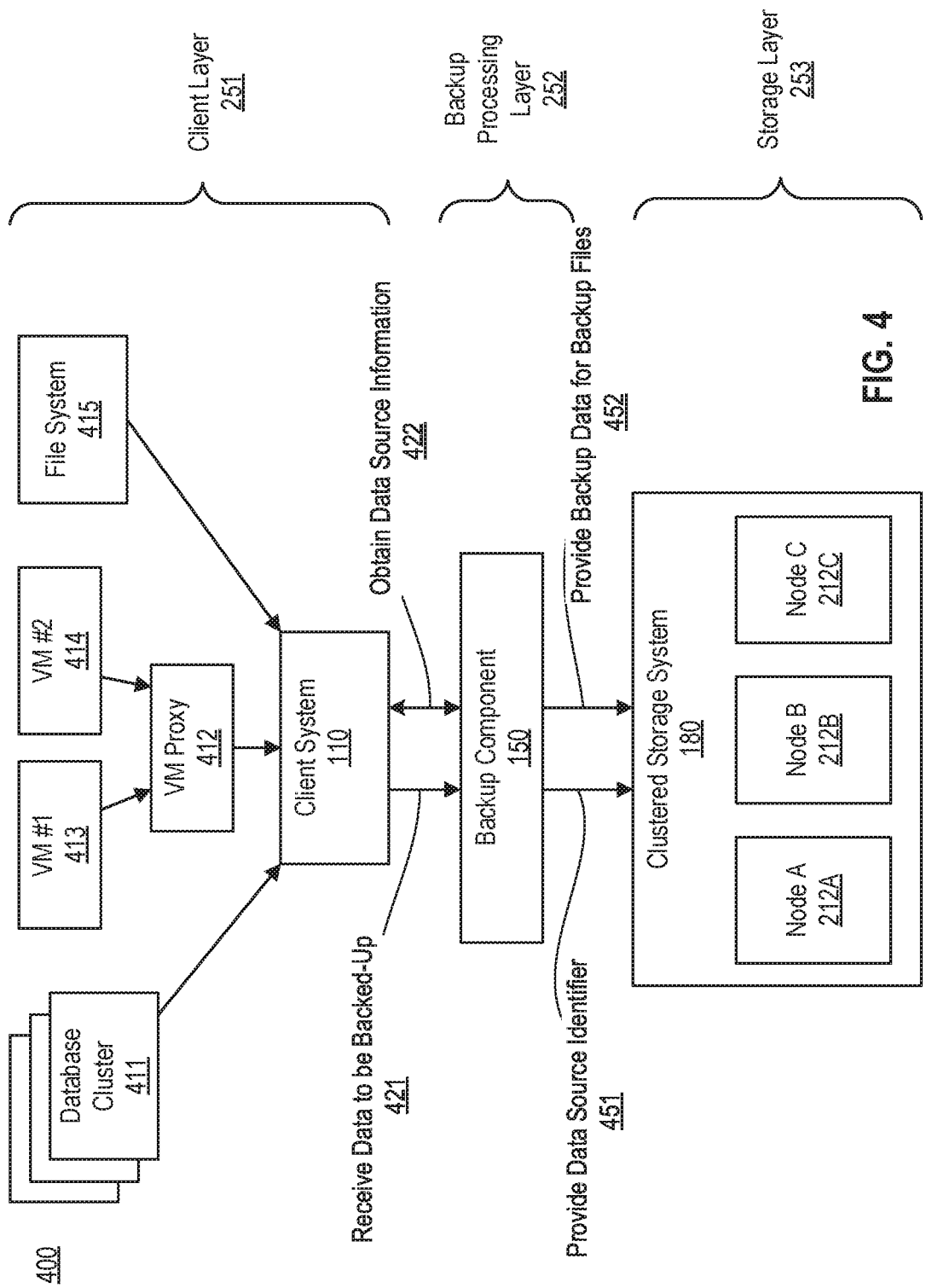
FIG. 4 is a block diagram illustrating an example interaction between components for providing data source information to a clustered storage system according to one or more embodiments of the disclosure.

FIG. 4 is a block diagram 400 illustrating an example interaction between components for providing data source information to a clustered storage system according to one or more embodiments of the disclosure. As shown, a client system (or client server) 110 may be associated with one or more data sources (e.g. data sources 411-415). The data sources may be part of, or work in conjunction with, the client system 110. For example, the data sources may be part of a separate server, or part of a cloud storage infrastructure. Accordingly, the client system 110 and the data sources may be part of a client layer 251 that provides data to be backed up by a backup component 150 that is part of a backup processing layer 252. As shown, the client system 110 may provide (or transmit, send, transfer, forward, etc.) data to be backed-up (e.g. raw data) to the backup component 150 as part of a backup process. In some embodiments, data may be sent to the backup component 150 at various time points as part of a backup schedule (e.g. hourly, daily, etc.).

Accordingly, as shown in 421, the backup component 150 may receive data to be backed-up from the client system 110 and may process such data to initiate the creation of one or more backup files. In some embodiments, only the backup component 150 may be able to communicate with the client layer 251. For example, the backup component 150 may only be able to access a client system 110 that acts as a proxy (or intermediary) to obtain such data from the data sources. In response to receiving the data, as shown in 422, the backup component 150 may obtain data source information associated with the received data from the client system 110. The data source information may include any form of information that may be used (directly or indirectly) to create an identifier (or unique identifier) for a data source. For example, the data source identifier may include a device (or host) address (e.g. IP, network, or MAC address, etc.), an identifier (e.g. VM ID, database ID, storage ID, etc.), or other form of identifier (e.g. device name, customer ID, client ID, etc.). In some embodiments, a data source identifier may be generated. For example, a hash value may be generated from the data source information and be associated with a particular data source. For example, an IP address of a data server may be used to generate a unique hash value associated with the data server.

In some embodiments, the data source identifier may identify a more granular (e.g. specific) data source than the more general client system 110 that may be associated with multiple data sources. For example, as shown, the data to be backed-up (e.g. application data, operating system data, database records or objects, etc.) may originate from more than one VM (e.g. VMs 413 and 414) via a VM Proxy 412, and therefore, the data source identifier may include the particular VM ID (e.g. VM ID for VMs 413 or 414) instead of the VM ID for VM Proxy 412. As another example, as shown Cluster Database 411 may include several databases (or databases instances), and accordingly, the data source identifier may be a database ID for a particular database or instance within the cluster.

In order to obtain such granular identifying information, the backup component 150 may leverage the ability to access components of the client system 110 in a manner unavailable to the storage layer 253. For example, the backup component 150 may be authorized to access (e.g. via an API) a particular client layer 251 component such as a particular data source, client system 110, client system application, etc. and act as an intermediary to transfer data source information to the clustered storage system 180. The backup component 150 may obtain the data source information as part of the backup process (e.g. the operation that transmits data to the backup component 150), or as a separately initiated operation. For example, the separately initiated operation may include directly accessing (e.g. querying) the client system 110, data sources 411-415, or associated component to obtain data source information. For instance, the backup component may query a VM proxy (e.g. VM proxy 412) of the client system 110 to obtain data source identification information of a particular VM ID of a VM (e.g. VMs 413 or 414) that is associated with data to be backed up.

In some embodiments, the backup component 150 may have access to a particular client layer 251 API to obtain such granular data source information. For example, backup component 150 may work in conjunction with a client component such as a client backup application or plug-in that resides within the client layer 251. Accordingly, the backup component 150 may access an API provided by an associated plug-in to obtain data source information.

In some embodiments, the client system 110 may provide (e.g. transmit, transfer, send, etc.) data to the backup component 150 via a protocol (e.g. backup, storage, or transfer protocol, etc.). For example, a backup protocol may include the OST (OpenStorage Technology) protocol that may include an API that allows components (e.g. NetBackup Media servers) to interact with storage devices including cloud-computing storage devices. Accordingly, in some embodiments, information included as part of a protocol may be used as a basis for the data source identifying information. For example, the backup component 150 may parse information included as part of the protocol transmission to obtain information such as data source information (e.g. particular database identifier) or destination (or target) of the data (e.g. particular backup component endpoint).

After deriving one or more data source identifiers, the backup component 150 may associate a particular data source identifier with portions of data received from the client system 110. For example, the backup component may determine a portion of data received from the client system 110 may be used to create a particular backup file. Accordingly, the backup component may obtain data source information for the particular portion of data and generate a data source identifier associated with the particular portion of the data that is used to create a backup file.

In some embodiments, the backup component 150 may provide data to the clustered storage system 180 by requesting the clustered storage system to write (or create) particular backup files. As described, the backup component 150 may perform processing of the data (backup files). In some embodiments, the cluster storage system 180 may perform certain data processing functions such as the deduplication. For example, as described, nodes (e.g. nodes 212A-C) may host a component stack (e.g. software stack) that includes a file system with deduplication capabilities. Irrespective of the particular configuration, the backup component 150 may transmit backup data to be stored by the clustered data storage system 180 along with the data source identifiers.

As shown, the clustered storage system 180 may include the storage nodes 212 (e.g. storage nodes 212A-C), and related components that may form a storage layer 253. In previous systems, distributing backup files or data amongst a set of nodes may have been strictly based on resource utilization such as storage capacity, CPU usage, bandwidth etc. However, in some embodiments described herein, the clustered storage system 180 may distribute backup files by considering a source of the data. For example, the clustered storage system 180 may ensure (e.g. to an extent determined by a predefined distribution policy) that data originating from a particular granular data source is stored together on the same node or storage partition (e.g. storage partition of a particular node, or a storage partition comprising a set of nodes). Accordingly, the clustered storage system 180 may obtain a higher degree of deduplication efficiency as the likelihood of data being related (e.g. deduplicable) may increase if originating from the same data source.

To provide the ability for the clustered storage system 180 to intelligently distribute backup data amongst a set of nodes, the backup component 150 may provide (e.g. transmit, send, transfer, inject, input, etc.) a data source identifier to the clustered data storage system 180 as shown in 451. In some embodiments, the data source identifier may be in the form of a placement tag. This data source identifier (e.g. placement tag) may be provided to the clustered storage system 180 along with the associated (or corresponding) portion of backup data as shown in 452. In some embodiments, the data source identifier may be provided at the same time as the backup data (e.g. as part of the data, or as an input to an operation), or the data source identifier may be provided separately or at a different time from when the backup data is provided to the clustered storage system 180. The backup component 150 may provide the data source identifier to the clustered storage system 180 using one or more techniques.

In some embodiments, the data source identifier may be provided as an input to an operation that writes (or creates) a backup file to the clustered storage system 180. For example, the input may include the data source identifier as an argument to a method (or operation) that initiates the creation of a backup file to the clustered storage system 180. In some embodiments, the backup component 150 may initiate creation of a backup file using an API provided by the clustered storage system 180. For example, the clustered storage system 180 may provide an API to access a storage layer (or protocol) to which the data source identifier may be passed along with a portion of data to be used to create a backup file. Accordingly, in some embodiments, the data source identifier may be provided to the clustered storage system 180 at the time of a backup file write (or create) request. Accordingly, the file write may be performed by the clustered storage system 180 directly to a particular storage node via the backup component 150.

In some embodiments, the data source identifier may be provided (or injected) directly to a file system or namespace managed by the clustered storage system 180. For example, the backup component 150 may provide a data source identifier by setting (or specifying) the identifier as a file attribute. In another example, the backup component 150 may provide the data source identifier by specifying the identifier as part of metadata (e.g. metadata attribute, metadata file, index, database, etc.) associated with a backup file. In some embodiments, the data source identifier may be provided to an index of the clustered storage system 180. For example, the backup component 150 may provide (e.g. inject) the data source identifier directly to an index such as an index file, index database, or index node (e.g. inode) that is managed, maintained, and/or referenced by the clustered storage system 180. As another example, the data source identifier may be written to an index maintained by the backup component 150, and the index may be provided as a separate index file (or other file format) to the clustered storage system 180.

Once the data source identifier is received, the clustered storage system 180 (e.g. via cluster workload balancer 206) may then use such information to intelligently distribute the backup files amongst the set of storage nodes 212. For example, the clustered storage system 180 may implement a global namespace, and accordingly, data source information may be used to store related backup files on a particular node despite the system appearing as a single system to external components. In some embodiments, the backup file may be distributed for storage at the time of creation, or after the time of creation. As described, in some embodiments, the data source identifier may be stored in manner to improve performance of the system. For example, the data source identifier may be stored in an index. For instance, access to a backup file may include loading an index node into memory (e.g. cache), and therefore, the data source information may be available to file access requests (e.g. read and/or write requests) without requiring the utilization of additional resources. In some embodiments, the data source identifier may also be stored as extended attributes of a file system, namespace, or other persistent form of file-specific information. In addition, as part of a storage and/or writing process of the backup file, the data source information may be relayed to the node (e.g. via API 304).

Figure 5:
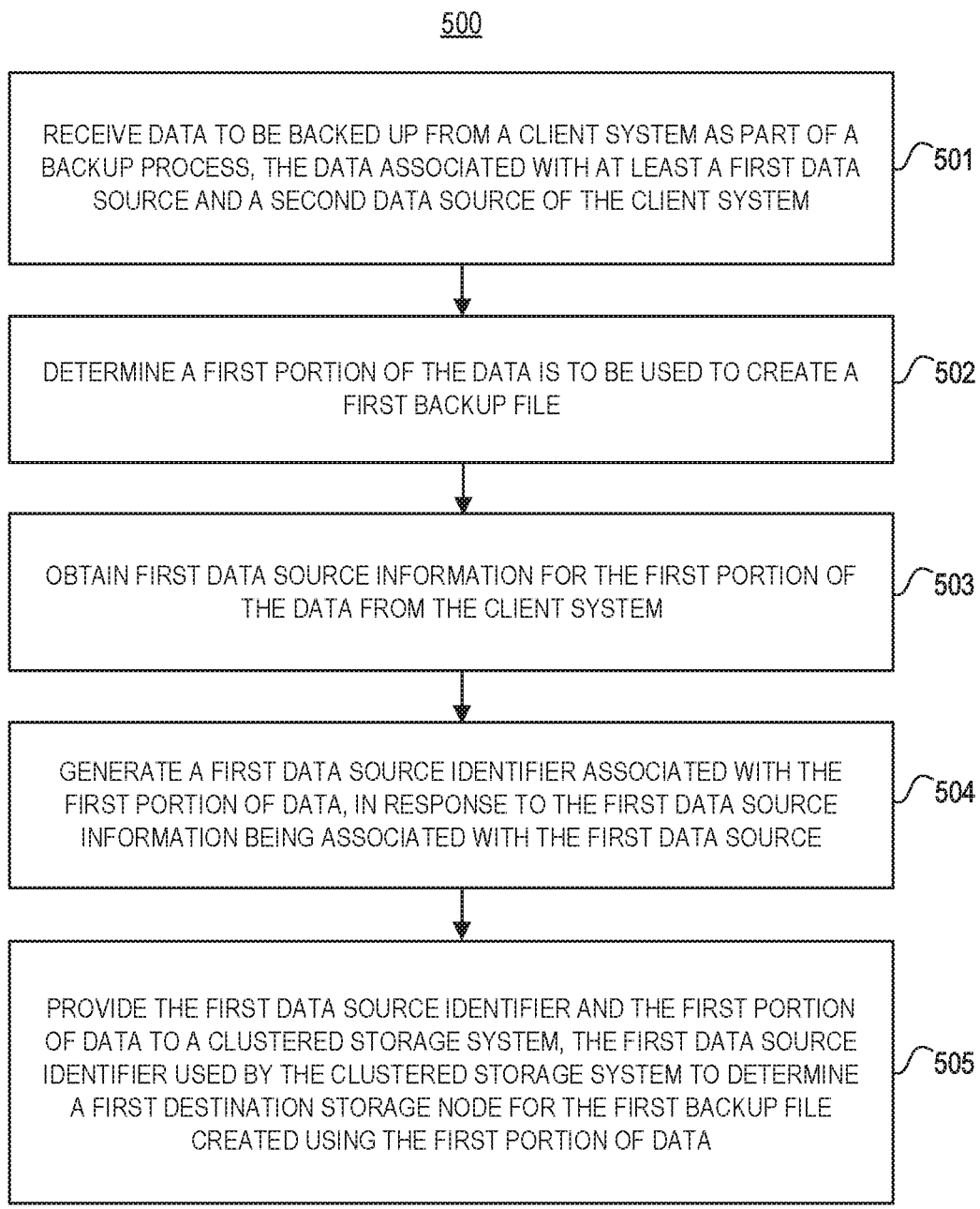
FIG. 5 is a flow diagram illustrating an example method of providing data source identification information to a clustered storage system for a first portion of data according to one or more embodiments of the disclosure.

FIG. 5 is a flow diagram illustrating an example method of providing data source identification information to a clustered storage system for a first portion of data according to one or more embodiments of the disclosure. Process 500 may use processing logic, which may include software, hardware, or a combination thereof. For example, process 500 may be performed by a system including one or more components described in operating environment 100 (e.g. backup component 150 and/or clustered storage system 180).

In 501, the system (e.g. backup component 150) may receive data to be backed-up from a client system (e.g. client system 110) as part of a backup process. In one embodiment, the data may be associated with at least a first data source and a second data source of the client system (e.g. first and second data source amongst data sources 411-415).

In 502, the system may determine a first portion of the data is to be used to create a first backup file. For example, the system may analyze the received data and determine how the data is to be divided into portions (e.g. chunked) as the basis for backup files. In some embodiments, the backup data may be passed to the clustered storage system 180 and a component of a storage node 212 (e.g. DDS 302) may determine how a backup file is to be processed (e.g. divided, deduplicated, etc.)

In 503, the system may obtain first data source information for the first portion of the data from the client system. In one embodiment, obtaining the first data source information from the client system may include querying, by the backup component, a component of the client system (e.g. client system 110, VM Proxy 412, Database Cluster 411, etc.). For example, obtaining data source information may including obtaining at least one of a databases identifier, a virtual machine identifier, and a device address In 504, the system may generate a first data source identifier associated with the first portion of data. For example, the data source identifier may be generated as a hash value from the obtained information. In one embodiment, the system may generate the first data source identifier in response to the first data source information being associated with the first data source. In addition, in some embodiments, the system may generate a data source identifier in response to determining the data source information corresponds to a particular data source.

In 505, the system may provide the first data source identifier and the first portion of data to a clustered storage system. As described, the first data source identifier may be used by the clustered storage system to determine a first destination storage node (e.g. one of storage nodes 212A-C) for the first backup file created using the first portion of data. In some embodiments, the clustered storage system may implement a global namespace that represents the clustered storage system as a single storage node to the system (e.g. backup component 150). Accordingly, the data source identifier may be used to group backup data from the same data source on the same node despite using a global namespace.

In some embodiments, providing the data source identifier and the portion of data to the clustered storage system may include the system providing the data source identifier with the portion of data as part of initiating an operation to request the clustered storage system to write the backup file using the portion of data. As another example, the system may assign the data source identifier as an attribute for the backup file created using the portion of data. For example, the attribute may be stored within the backup file itself. As yet another example, the system may inject (or write) the data source identifier directly to an index maintained by the clustered storage system and associated with the backup file. For example, the index may include an index node (e.g. inode) utilized by the clustered storage system.

As described, the system may provide a mechanism for distributing data from a backup process based on other backup data distributed to various storage nodes of a clustered storage system. For example, the system may distribute backup data based on the distribution of backup files from previous backup processes.

Figure 6:
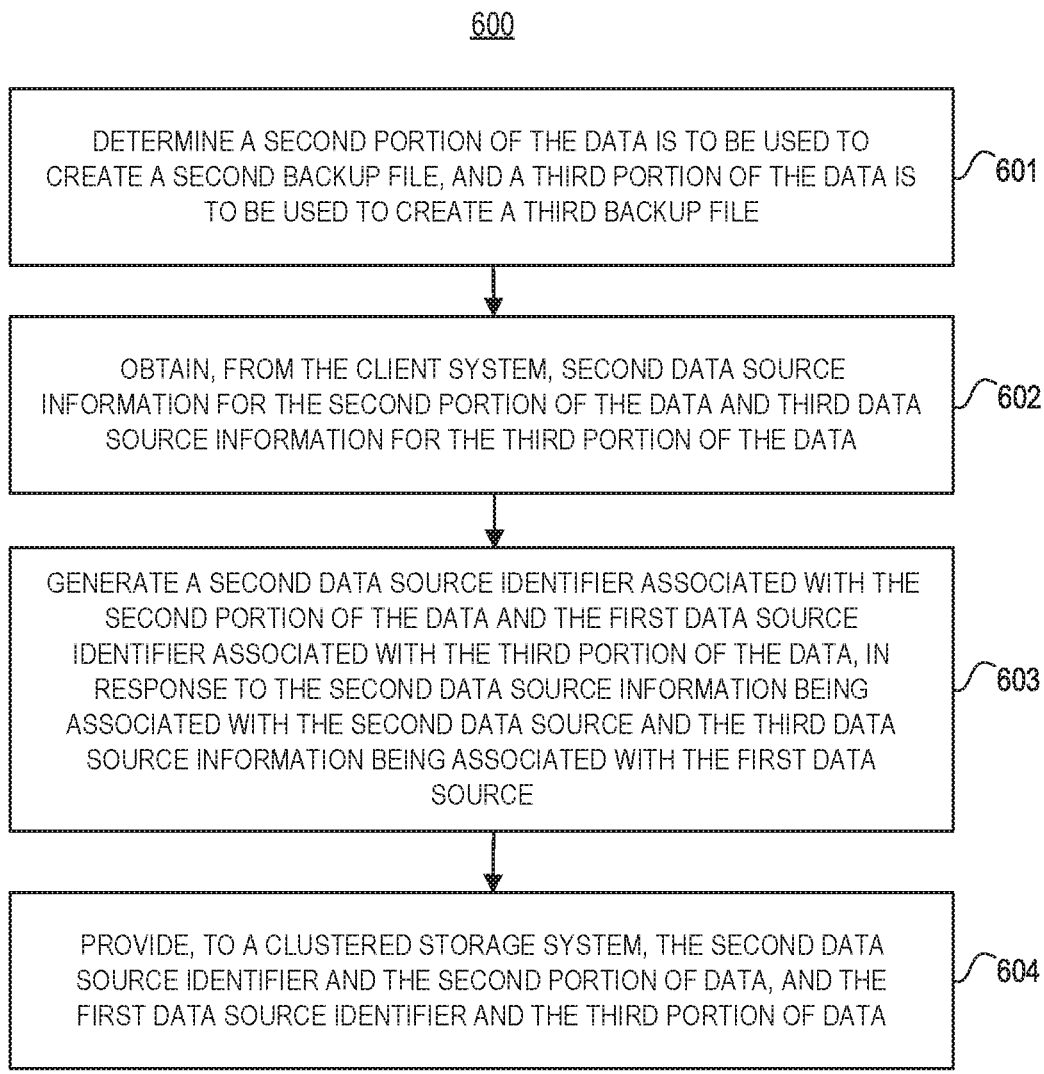
FIG. 6 is a flow diagram illustrating an example method of providing data source identification information to a clustered storage system for additional portions of data according to one or more embodiments of the disclosure.

FIG. 6 is a flow diagram illustrating an example method of providing data source identification information to a clustered storage system for additional portions of data according to one or more embodiments of the disclosure. Process 600 may use processing logic, which may include software, hardware, or a combination thereof. For example, process 600 may be performed by a system including one or more components described in operating environment 100 (e.g. backup component 150 and/or clustered storage system 180).

In 601, the system may determine a second portion of the data is to be used to create a second backup file, and a third portion of the data is to be used to create a third backup file. For example, the additional data portions (e.g. second and third portions) may be part of the same backup process, or part of a subsequent backup process, described in FIG. 5.

In 602, the system may obtain, from the client system, second data source information for the second portion of the data and third data source information for the third portion of the data.

In 603, the system may generate a second data source identifier associated with the second portion of the data and the first data source identifier associated with the third portion of the data. In one embodiment, the system may generate the second data source identifier in response to the second data source information being associated with the second data source and generate the first data source identifier in response to the third data source information being associated with the first data source. For example, both the first data portion and the third data portion may originate from the same data source (e.g. data source 415), and accordingly, may be associated with the same data source identifier (e.g. first data source identifier for data source 415).

In 604, the system may provide, to a clustered storage system, the second data source identifier and the second portion of data, and the first data source identifier and the third portion of data. In one embodiment, the second data source identifier may be used by the clustered storage system to determine a second destination storage node for the second backup file, which is created using the second portion of data. For example, the system may perform such a determination in response to the second backup file being associated with a different data source than the first backup file.

In addition, in one embodiment, the first data source identifier may be used by the clustered storage system to determine the first destination storage node for the third backup file, which is created using the third portion of data. For example, the system may perform such a determination in response to the third backup file being associated with a same data source as the first backup file.

Accordingly, in some embodiments, described is a system that may utilize a specialized process to provide granular data source identification to a clustered storage system to obtain deduplication storage efficiency amongst a set of storage nodes.

Figure 7:
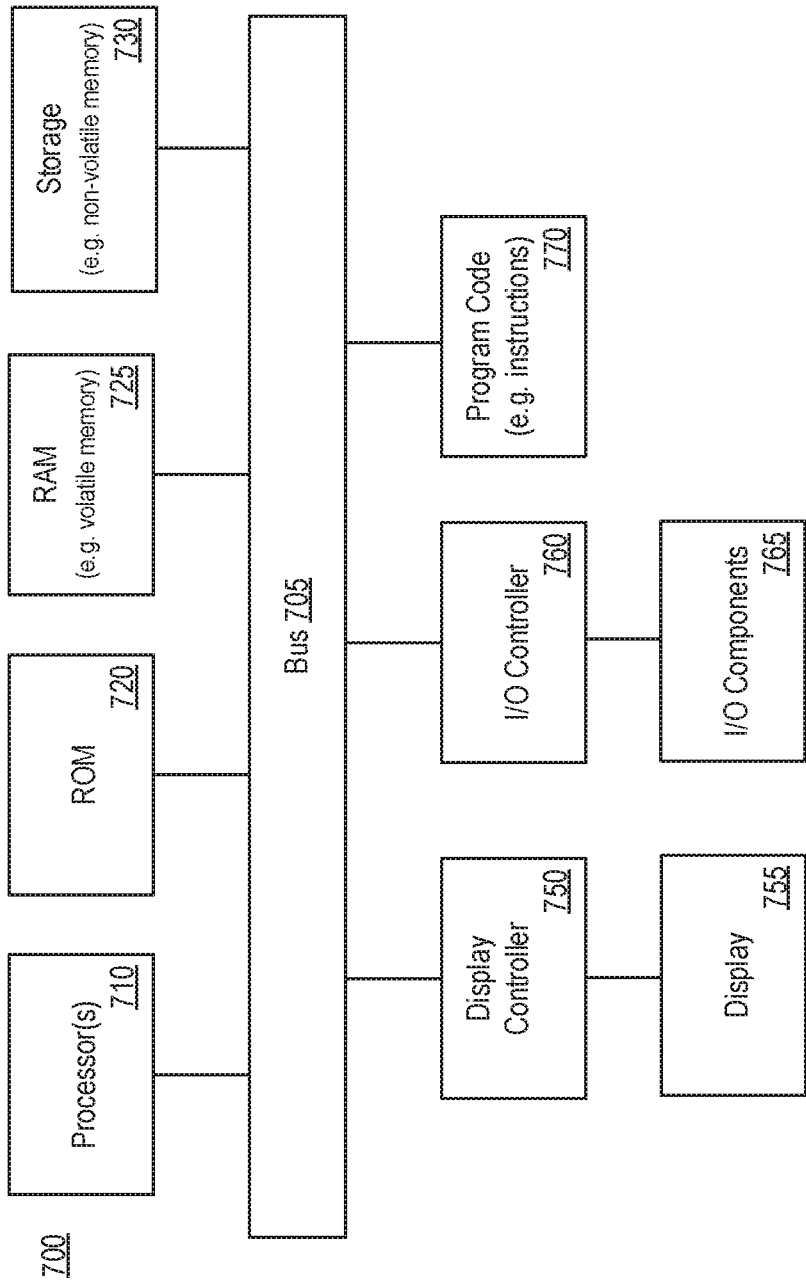
FIG. 7 is a block diagram illustrating an example of a computing system that may be used in conjunction with one or more embodiments of the disclosure.

FIG. 7 shows a block diagram of an example of a computing system that may be used in conjunction with one or more embodiments of the disclosure. For example, computing system 400 (or system, or server, or computing device, or device) may represent any of the devices or systems (e.g. backup component 150, clustered storage system 180, storage node 212, etc.) described herein that perform any of the processes, operations, or methods of the disclosure. Note that while the computing system 700 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 700 may include a bus 705 which may be coupled to a processor 710, ROM (Read Only Memory) 720, RAM (or volatile memory) 725, and storage (or non-volatile memory) 730. The processor(s) 710 may retrieve stored instructions from one or more of the memories 720, 725, and 730 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 710 may perform operations in an on-demand or "cloud computing" environment or as a service (e.g. within a "software as a service" (SaaS) implementation). Accordingly, the performance of operations may be distributed among the one or more processors 710, whether residing only within a single machine or deployed across a number of machines. For example, the one or more processors 710 may be located in a single geographic location (e.g. within a home environment, an office environment, or a server farm), or may be distributed across a number of geographic locations. The RAM 725 may be implemented as, for example, dynamic RAM (DRAM), or other types of memory that require power continually in order to refresh or maintain the data in the memory. Storage 730 may include, for example, magnetic, semiconductor, tape, optical, removable, non-removable, and other types of storage that maintain data even after power is removed from the system. It should be appreciated that storage 730 may be remote from the system (e.g. accessible via a network).

A display controller 750 may be coupled to the bus 705 in order to receive display data to be displayed on a display device 755, which can display any one of the user interface features or embodiments described herein and may be a local or a remote display device. The computing system 700 may also include one or more input/output (I/O) components 765 including mice, keyboards, touch screen, network interfaces, printers, speakers, and other devices. Typically, the input/output components 765 are coupled to the system through an input/output controller 760.

Program code 770 may represent any of the instructions, applications, software, libraries, toolkits, modules, components, engines, units, functions, logic, etc. as described herein (e.g. backup component 150). Program code 770 may reside, completely or at least partially, within the memories described herein (e.g. non-transitory computer-readable media), or within a processor during execution thereof by the computing system. Program code 770 may include both machine code, such as produced by a compiler, and files containing higher-level or intermediate code that may be executed by a computing system or other data processing apparatus (or machine) using an interpreter. In addition, program code 770 can be implemented as software, firmware, or functional circuitry within the computing system, or as combinations thereof. Program code 770 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that the term "approximately" or "substantially" may be used herein and may be interpreted as "as nearly as practicable," "within technical limitations," and the like. In addition, the use of the term "or" indicates an inclusive or (e.g. and/or) unless otherwise specified. Reference to ordinal numbers such as "first," "second," "third," etc. may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
one or more processors; and
a non-transitory computer readable medium storing a plurality of instructions, which when executed, cause the one or more processors to:
receive, at a backup system, data to be backed up from a first data source and a second data source through a client system to a cluster storage system as part of a backup process, the first data source and the second data source being components of the client system;
determine, at a backup system, a plurality of portions of the received data as a basis for creating a plurality of backup files to be provided to the cluster storage system by analyzing the received data as part of the backup process, the portions including at least a first portion of the received data that is to be used to create a first backup file;
obtain, at the backup system from the client system, first data source information for the first portion of the data by querying the components of the client system as part of the backup process in response to determining the first portion is a basis for creating the first backup file, the first data source information including an identity of a device that is a component of the client system and is identified as the first data source from which the first portion of the data was obtained;
generate, at the backup system, a first data source identifier associated with the first portion of data based on the obtained first data source information associated with the first data source as part of the backup process; and
provide, by the backup system, the first data source identifier and the first portion of data to the clustered storage system, the first data source identifier used by the clustered storage system to determine a first destination storage node for the first backup file created using the first portion of data, the first destination storage node storing backup files of data from the first data source.

2. The system of claim 1, wherein the plurality of instructions, when executed, further cause the one or more processors to:
determine a second portion of the data is to be used to create a second backup file, and a third portion of the data is to be used to create a third backup file;
obtain, from the client system, second data source information for the second portion of the data and third data source information for the third portion of the data;
generate a second data source identifier associated with the second portion of the data and the first data source identifier associated with the third portion of the data, in response to the second data source information being associated with the second data source and the third data source information being associated with the first data source;
provide, to a clustered storage system, the second data source identifier and the second portion of data, and the first data source identifier and the third portion of data, the second data source identifier used by the clustered storage system to determine a second destination storage node for the second backup file, in response to the second backup file being associated with a different data source than the first backup file, and the first data source identifier used by the clustered storage system to determine the first destination storage node for the third backup file, in response to the third backup file being associated with a same data source as the first backup file.

3. The system of claim 1, wherein providing the first data source identifier and the first portion of data to the clustered storage system includes providing the first data source identifier with the first portion of data as part of an operation to request the clustered storage system to write the first backup file using the first portion of data.

4. The system of claim 1, wherein providing the first data source identifier and the first portion of data to the clustered storage system includes injecting the first data source identifier directly to an index maintained by the clustered storage system and associated with the first backup file.

5. The system of claim 1, wherein providing the first data source identifier and the first portion of data to the clustered storage system includes assigning the first data source identifier as an attribute for the first backup file.

6. The system of claim 1, wherein obtaining the first data source information from the client system includes querying, by a backup component, a component of the client system.

7. The system of claim 1, wherein obtaining the first data source information from the client system includes obtaining at least one of a database identifier, a virtual machine identifier, and a device address.

8. The system of claim 1, wherein the clustered storage system implements a global namespace representing the clustered storage system as a single storage node to the system.

9. A method comprising:
receiving, at a backup system, data to be backed up from a first data source and a second data source through a client system to a cluster storage system as part of a backup process, the first data source and the second data source being components of the client system;
determining, at a backup system, a plurality of portions of the received data as a basis for creating a plurality of backup files to be provided to the cluster storage system by analyzing the received data as part of the backup process, the portions including at least a first portion of the received data that is to be used to create a first backup file;

obtaining, at the backup system from the client system, first data source information for the first portion of the data by querying the components of the client system as part of the backup process in response to determining the first portion is a basis for creating the first backup file, the first data source information including an identity of a device that is a component of the client system and is identified as the first data source from which the first portion of the data was obtained;

generating, at the backup system, a first data source identifier associated with the first portion of data based on the obtained first data source information associated with the first data source as part of the backup process; and providing, by the backup system, the first data source identifier and the first portion of data to the clustered storage system, the first data source identifier used by the clustered storage system to determine a first destination storage node for the first backup file created using the first portion of data, the first destination storage node storing backup files of data from the first data source.

10. The method of claim 9, further comprising:

determining a second portion of the data is to be used to create a second backup file, and a third portion of the data is to be used to create a third backup file;

obtaining, from the client system, second data source information for the second portion of the data and third data source information for the third portion of the data;

generating a second data source identifier associated with the second portion of the data and the first data source identifier associated with the third portion of the data, in response to the second data source information being associated with the second data source and the third data source information being associated with the first data source;

providing, to a clustered storage system, the second data source identifier and the second portion of data, and the first data source identifier and the third portion of data, the second data source identifier used by the clustered storage system to determine a second destination storage node for the second backup file, in response to the second backup file being associated with a different data source than the first backup file, and the first data source identifier used by the clustered storage system to determine the first destination storage node for the third backup file, in response to the third backup file being associated with a same data source as the first backup file.

11. The method of claim 9, wherein providing the first data source identifier and the first portion of data to the clustered storage system includes providing the first data source identifier with the first portion of data as part of an operation to request the clustered storage system to write the first backup file using the first portion of data.

12. The method of claim 9, wherein providing the first data source identifier and the first portion of data to the clustered storage system includes injecting the first data source identifier directly to an index maintained by the clustered storage system and associated with the first backup file.

13. The method of claim 9, wherein providing the first data source identifier and the first portion of data to the clustered storage system includes assigning the first data source identifier as an attribute for the first backup file.

14. The method of claim 9, wherein obtaining the first data source information from the client system includes querying, by a backup component, a component of the client system.

15. A computer program product comprising a non-transitory computer-readable medium having a computer-readable program code embodied therein to be executed by one or more processors, the program code including instructions to:

receive, at a backup system, data to be backed up from a first data source and a second data source through a client system to a cluster storage system as part of a backup process, the first data source and the second data source being components of the client system;

determine, at a backup system, a plurality of portions of the received data as a basis for creating a plurality of backup files to be provided to the cluster storage system by analyzing the received data as part of the backup process, the portions including at least a first portion of the received data that is to be used to create a first backup file;

obtain, at the backup system from the client system, first data source information for the first portion of the data by querying the components of the client system as part of the backup process in response to determining the first portion is a basis for creating the first backup file, the first data source information including an identity of a device that is a component of the client system and is identified as the first data source from which the first portion of the data was obtained;

generate, at the backup system, a first data source identifier associated with the first portion of data based on the obtained first data source information associated with the first data source as part of the backup process; and provide, by the backup system, the first data source identifier and the first portion of data to the clustered storage system, the first data source identifier used by the clustered storage system to determine a first destination storage node for the first backup file created using the first portion of data, the first destination storage node storing backup files of data from the first data source.

16. The computer program product of claim 15, wherein the program code includes further instructions to:

determine a second portion of the data is to be used to create a second backup file, and a third portion of the data is to be used to create a third backup file;

obtain, from the client system, second data source information for the second portion of the data and third data source information for the third portion of the data;

generate a second data source identifier associated with the second portion of the data and the first data source identifier associated with the third portion of the data, in response to the second data source information being associated with the second data source and the third data source information being associated with the first data source;

provide, to a clustered storage system, the second data source identifier and the second portion of data, and the first data source identifier and the third portion of data, the second data source identifier used by the clustered storage system to determine a second destination storage node for the second backup file, in response to the second backup file being associated with a different data source than the first backup file, and the first data source identifier used by the clustered storage system to determine the first destination storage node for the third backup file, in response to the third backup file being associated with a same data source as the first backup file.

17. The computer program product of claim 15, wherein providing the first data source identifier and the first portion of data to the clustered storage system includes providing the first data source identifier with the first portion of data as part of an operation to request the clustered storage system to write the first backup file using the first portion of data.

18. The computer program product of claim 15, wherein providing the first data source identifier and the first portion of data to the clustered storage system includes injecting the first data source identifier directly to an index maintained by the clustered storage system and associated with the first backup file.

19. The computer program product of claim 15, wherein providing the first data source identifier and the first portion of data to the clustered storage system includes assigning the first data source identifier as an attribute for the first backup file.

20. The computer program product of claim 15, wherein obtaining the first data source information from the client system includes querying, by a backup component, a component of the client system.

* * * * *